United States Patent Office 3,328,204
Patented June 27, 1967

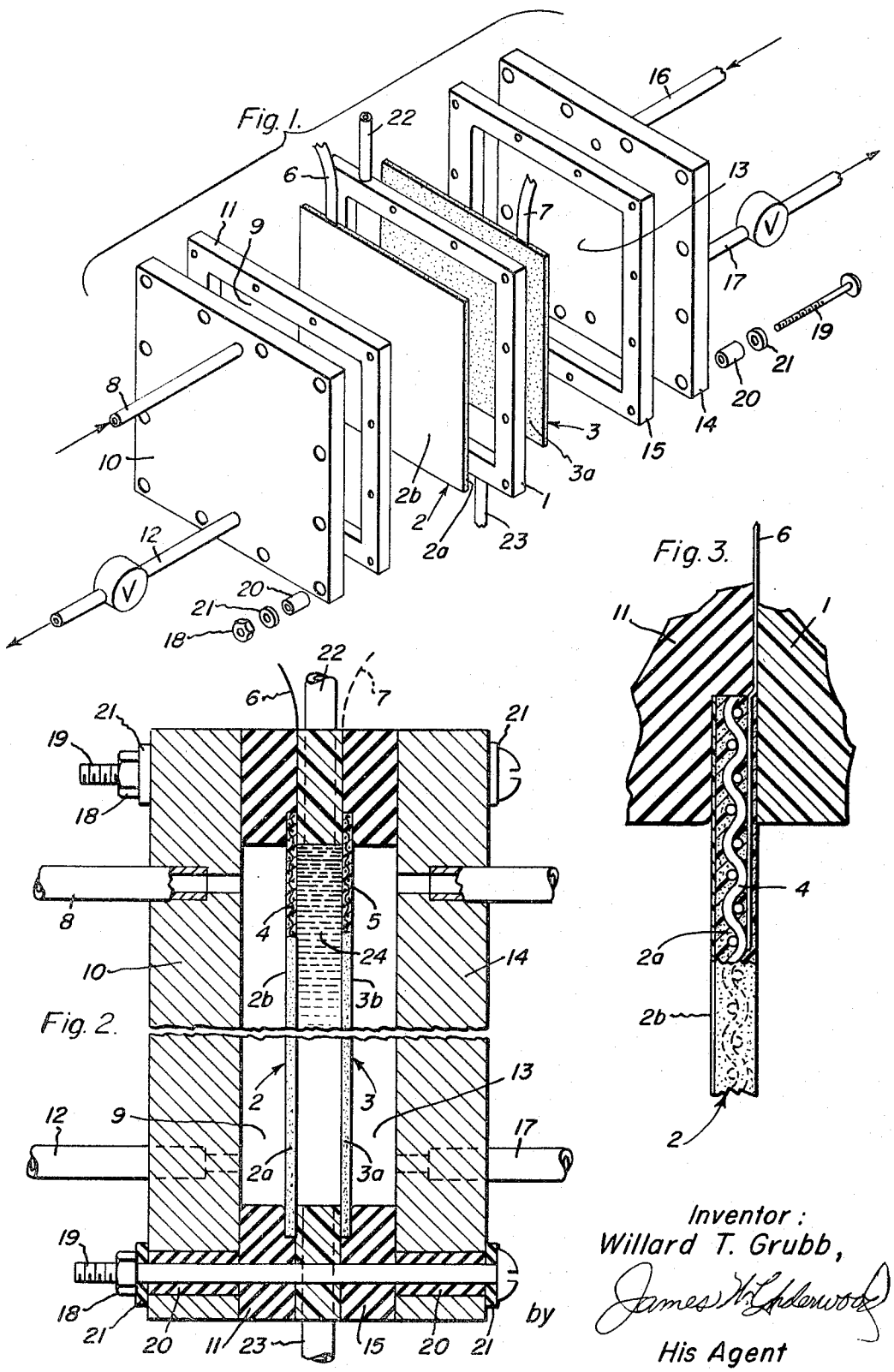

3,328,204
PROCESS OF ELECTRICAL ENERGY GENERA-
TION UTILIZING ALKANES AND PHOS-
PHORIC ACID
Willard T. Grubb, Schenectady, N.Y., assignor to General Electric Company, a corporation of New York
Filed Apr. 8, 1963, Ser. No. 271,356
7 Claims. (Cl. 136—86)

This invention relates to improved fuel cells and to a process of producing electrical energy from such fuel cells. More particularly, this invention relates to an improved fuel cell capable of oxidizing fluid, saturated hydrocarbon fuels completely to carbon dioxide with the production of electrical energy at current densities up to and including the maximum power capability of the fuel cell under the cell operating conditions. The fuel cell comprises a pair of gas adsorbing, gas-permeable, electronically conductive electrode elements in direct contact with an aqueous phosphoric acid solution whose concentration, calculated as $P_2O_5$, is essentially from 54% to 76% (i.e., from about 74 to 105% $H_3PO_4$). The fuel cell is operated so that the electrolyte is at a temperature of at least 130° C. but no greater than 250° C. and also is in the range of from 100° C. below the boiling point up to the boiling point of the particular concentration of electrolyte used at the ambient pressure above the electrolyte.

Many types of fuel cells are proposed in the prior art, some using alkaline electrolytes, either in the molten state or as aqueous solutions, and others utilizing acidic electrolytes. The oxidant gas is usually oxygen or air and the fuels may be hydrogen, carbon monoxide, gaseous, unsaturated and saturated hydrocarbons, gaseous, oxygenated hydrocarbons such as alcohols, etc. Hydrogen is usually the preferred fuel because of its greater reactivity and the only product of the cell reaction is water which must be removed by evaporation from either the basic or acidic electrolyte by circulation of the electrolyte to an evaporator external from the fuel cell, or by permitting the water to evaporate from the electrodes of the fuel cell at a controlled rate equal to the rate of formation by the cell reaction in order to maintain the concentration of the electrolyte within acceptable limits. Since variation in electrolyte composition causes variation in the performance of the fuel cell, it is highly desirable to operate the fuel cell with an invariant electrolyte, i.e., the composition remains constant. Cell performance also varies with electrolyte concentration but the effect is not noticeable as long as the concentration is maintained within narrow limits. When carbonaceous fuels including carbon monoxide and the other hydrocarbons are used as the fuel, carbon dioxide as well as water is a product of the cell reaction, providing the fuel is completely oxidized. Many of the prior art fuel cells are not capable of completely oxidizing gaseous, carbonaceous fuels, especially the hydrocarbon fuels, completely to carbon dioxide and these partially oxidized products cause loss of cell efficiency as well as operating difficulties.

Acidic electrolytes such as sulfuric acid and phosphoric acid are the best electrolytes to use in the low temperature range of room temperature up to about 100° C. to obtain best performance of a fuel cell using gaseous, saturated hydrocarbon fuels. Since the carbon dioxide is a gas and is not reactive with these acids, its removal from the electrolyte presents no special problem, since it is more easily removed than the water. Unfortunately, when gaseous, saturated hydrocarbon fuels, which are the most readily available and easiest to handle, are used with these acid electrolytes, prior investigators noted that there was a limiting current density which, if exceeded, caused the fuel cell to fail to produce any useful electricity. This usually occurred before the current density reached 30 milliamperes per square centimeter (ma./cm.$^2$) and always occurred before the cell had attained the maximum power capability for the operating conditions at which the cell was operated, i.e., the cell would have produced more power if it could have been operated beyond the limiting current density. Such a condition did not occur when hydrogen, oxygenated hydrocarbons or unsaturated hydrocarbons were used as fuels.

With alkaline electrolytes, even with complete oxidation of hydrocarbons to carbon dioxide, the carbon dioxide reacts with the hydroxide type electrolyte to produce carbonates and with the carbonate type electrolytes to produce bicarbonates, causing the composition of the electrolyte to change and thus the performance of the fuel cell. Removal of carbon dioxide is the greatest problem in operating fuel cells with alkaline electrolytes on hydrocarbon fuels. Even under the best of conditions, the fuel cells using alkaline electrolytes are not as effective for the conversion of saturated hydrocarbon fuels to electricity as the fuel cells using acidic electrolytes.

Therefore, it would be highly desirable to be able to operate fuel cells with acidic electrolytes with saturated hydrocarbons as the fuel under conditions which would permit the cell to be operated up to and including the maximum power capabilities of the cell. Unexpectedly, I have discovered that this objective may be attained with fuel cells using saturated hydrocarbon fuels by using phosphoric acid whose concentration, calculated as $P_2O_5$, is essentially from 54 to 76%, as the aqueous electrolyte which is at a temperature of at least 130° C. and also in the range of from 100° C. below the boiling point up to the boiling point of the electrolyte when the fuel cell is being operated. Furthermore, I have discovered that not only gaseous, saturated hydrocarbons, but liquid, saturated hydrocarbons as well, could be used as fuels, i.e., the fuel could be any fluid, saturated hydrocarbon.

My invention will be better understood by reference to the following description taken in connection with the drawings, in which:

FIG. 1 is an exploded view of a fuel cell within the scope of the present invention;

FIG. 2 is an enlarged cross-sectional view of the assembled fuel cell shown in FIG. 1 to show structural detail;

FIG. 3 is an enlarged cross-sectional view of the preferred embodiment of one of the electrode structures shown in FIGS. 1 and 2.

Figure 4:
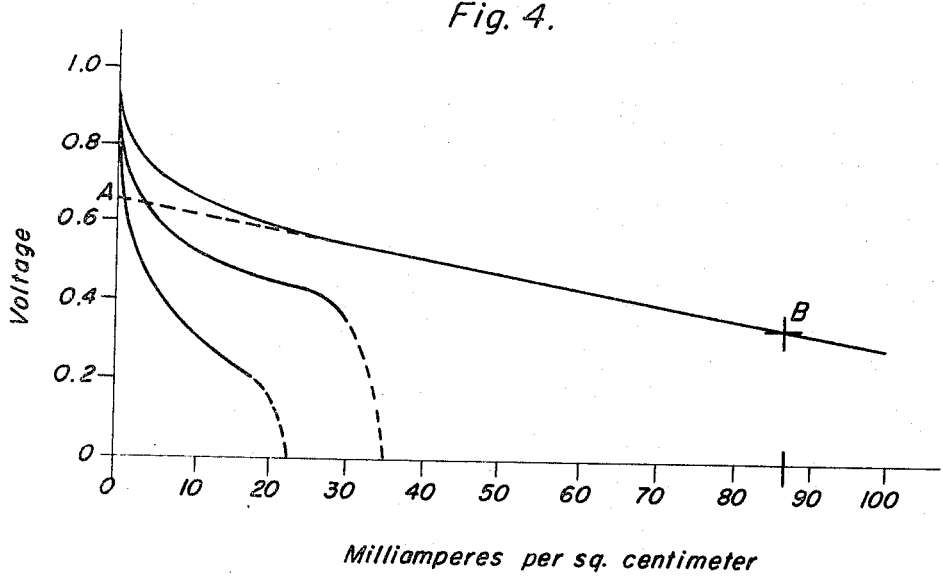
FIG. 4 shows three polarization curves obtained with the fuel cell with the upper curve being illustrative of my invention.

Although a number of different types of electrode structures are suitable for use in the cells of the present invention, each electrode should be one which: is electronically conductive, will adsorb the fuel or oxidant employed, will act as a catalyst of the electrode reaction, and will not itself be oxidized or corroded severely under the operating conditions of the cell. Especially suitable materials include the noble metals which are gold and the noble metals of the Group VIII series of metals of the Periodic Table of Elements which are rhodium, ruthenium, palladium, osmium, iridium and platinum. Although gold is not very gas-adsorbing and not as satisfactory as the other noble metals for making the anode, it does form a satisfactory cathode. Because of their ready availability and suitability, platinum and palladium are preferred. Other suitable gas-adsorbing metals are known, and many are described, for example, in "Catalysts, Inorganic and Organic," Berkman, Morrel and Egloff, Reinhold Publishing Company, New York (1940); "Catalytic Chemistry," H. W. Lohse, Chemical Publishing Company, Inc., New York (1945); etc. These include other metals of the Group VIII series of metals, e.g., nickel, iron, cobalt, etc. as well as other metals known to catalytically adsorb gases, e.g., silver, copper, metals of the transition series, e.g., manganese, vanadium, rhenium, etc., but these metals under normal cell operating conditions are severely attacked by the phosphoric acid and therefore, in order to be used for long term cell operation, should be protected, for example, electrolytically plated or alloyed with a non-corrodable metal, e.g., platinum, palladium, etc., prior to use. In addition, the electrodes may be formed of carbon which has been activated with the noble metals of the Group VIII series, e.g., platinum and palladium.

Since the adsorption of gases on solids is a surface phenomena, it is desirable that the electrode be of the maximum practicable surface area and that the surface of the metal particles preferably be in its most active state for the adsorption of gases. For maximum cell efficiency, the maximum permissible area of one side of each electrode should be in complete contact with the aqueous phosphoric acid electrolyte and the maximum permissible surface of the other side of each electrode should be in contact with the fuel or oxidant gas. For these reasons, I prefer to use finely divided metal powders, having highly developed surface areas, for example, at least one square meter per gram, and preferably at least 20 square meters per gram, in fabricating my electrode structures. Mixtures or alloys of two or more metals may also be used. For maximum cell performance, I prefer to make the electrodes by using the very active noble metal powders of the Group VIII metals, for example, platinum black, palladium black, etc.

Many ways are available for constructing the catalytically active electrodes and form no part of this invention. For example, they may be of the skeletal type obtained by forming an alloy of two metals and dissolving one of the metals leaving the other metal in a porous sheet of sufficient rigidity to use as the electrode. The metal powders may be compacted and sintered to produce the suitable electrodes having a porous nature, and if desired, can be of a multi-porous nature whereby the pores in contact with the electrolyte are smaller than the pores in contact with the fuel or oxidant gas. They may also be made by mixing metal powders with an inert binder, for example, polytetrafluoroethylene, as described in the Niedrach application, Ser. No. 108,418, filed May 8, 1961, now Patent No. 3,097,484, and assigned to the same assignee as the present invention. A very desirable electrode structure for use in the fuel cells of my invention is made by incorporating metal powders in polytetrafluoroethylene which has an additional film of polytetrafluoroethylene without metal particles on the electrode side in contact with the fluid fuel or oxidant gas. Such a structure is more fully disclosed and claimed in the application of Niedrach and Alford, Ser. No. 232,689, filed Oct. 24, 1962, and assigned to the same assignee as the present invention. The type and form of electrodes do not form a part of this invention and may be varied widely to suit the particular needs of applications of the fuel cell.

For a more complete understanding of the gaseous fuel cells of the present invention, reference is made to the drawings.

As shown in FIG. 1 and FIG. 2, the cell comprises an electrolyte chamber formed by electrodes 2 and 3 bearing against spacer 1 having ports 22 and 23 to permit filling of the electrolyte chamber with the phosphoric acid electrolyte 24 and also to permit circulation, if desired, of the electrolyte during fuel cell operation from the electrolyte chamber to a reservoir (not shown). Leads 6 and 7 connected to terminal grids 4 and 5, respectively, are used to deliver electrical current to the apparatus being operated by the cell. When the fuel is a gas, it is supplied from a storage source (not shown) through inlet 8 to electrode 2, or is contained solely in chamber 9 formed by end piece 10, gasket 11 and electrode 2. A valved outlet 12 is provided to exhaust any impurities or cell reaction products which enter, form or accumulate in chamber 9. When the saturated hydrocarbon fuel is a liquid, it is introduced at the bottom of the fuel chamber from a container (not shown) through the valved port 12 and allowed to overflow through port 8 to a receiver (not shown) which may be the same as the supply container, or the liquid fuel may be contained solely in chamber 9. The oxidant gas is supplied from a storage source (not shown) through inlet 16 to electrode 3 or is contained solely in chamber 13 formed by end plate 14, gasket 15 and electrode 3. A valved outlet 17 is provided for the withdrawal of the impurities or cell reaction products which enter, form or accumulate in chamber 13.

The end plates 10 and 14, gaskets 11 and 15, electrodes 2 and 3 and spacer 1 are held in gas-tight relationship with each other by means of a plurality of nuts 18, insulating washers 21 and bolts 19 which have insulating sleeves 20 which concentrically fit into the holes around the periphery of end plates 10 and 14, spacer 1 and gaskets 11 and 15. Other alternative means of clamping these elements together are readily apparent to those skilled in the art. End plates 10 and 14 can be made of any material which has structural strength and can resist the corrosion conditions encountered in the cell. They may be made, for example, of metal, but are preferably made from an insulating material such as is spacer 1, e.g., polytetrafluoroethylene, vulcanized fiber, fiber or fabric-base phenolic, urea or melamine laminates, hard rubber, etc., which are capable of withstanding the temperature at which the fuel cell is operated. In such a case, insulating sleeve 20 and insulating washer 21 may be omitted. Because of their chemical inertness and their ability to withstand high temperatures, polytetrafluoroethylene and copolymers of polytetrafluoroethylene and hexafluoropropylene are ideal materials and are preferred for fabrication of end plates 10 and 14 and spacer 1. Gaskets 11 and 15 may be made from any resilient material which will effectively form a gas-tight seal around the peripheral edges of the end plates and spacer, as well as hold the electrodes 2 and 3 in liquid-tight relationship against spacer 1 and may be, for example, a resilient, rubbery type of polymer or preferably one which is not affected by the feed gases or the reaction products with which it comes in contact, and is not affected by temperature of operation of the cell, e.g., synthetic rubber elastomers such as silicone rubber, rubbery polymers of fluorinated ethylene, resilient copolymers of polytetrafluoroethylene and hexafluoropropylene, etc. Insulating sleeves 20 and insulating washers 21 may be fabricated from any of the known insulators such as used for making end plates 10 and 14 and spacer 1.

FIG. 2 shows a vertical cross-section of the cell of FIG. 1 in the plane of fuel ports 8 and 12 and oxidant ports 16 and 17. In FIG. 2, the phosphoric acid electrolyte 24 is shown as an aqueous solution as previously described which may be sorbed on a matrix if desired, but is preferably present as a free flowing aqueous solution, since any matrix tends to increase the internal resistance of the cell. Terminal grids 4 and 5 are illustrated as being made from metal wire screen incorporated in the electrodes which are illustrated as being made from metal powders bonded together with a synthetic polymer. This screen provides reinforcement to the electrode structure, at the same time increasing the electrical conductivity and acting as a current collecting grid for supplying a path of low electrical resistance to the electrical current in the electrode. These terminal grids may, if desired, be held in contact with the surface of the electrode, but must make surface contact with the metal particles of the electrode. When electrodes 2 and 3 are made of a material which has a very low electrical resistance, for example, a porous metal structure, terminal grids 4 and 5 are not necessary and electrical leads 6 and 7 may be connected directly to electrodes 2 and 3.

FIG. 3 shows an enlarged cross-sectional view of a preferred type of electrode to use in the fuel cells of this invention, in which finely divided metal powder is mixed with polytetrafluoroethylene resin to obtain as uniform a dispersion as possible of the metal powder in the resin. A convenient way of doing this is to have an aqueous emulsion of polytetrafluoroethylene resin and mix it with from 2 to 20 grams of the metal powder per gram of polytetrafluoroethylene resin in the emulsion and form as thin a film as possible on a casting surface, such as a sheet of metal foil, metal plate, etc., forming the final shape of the electrode, if desired, evaporating the water from the emulsion, followed by sintering of the polytetrafluoroethylene under pressure, if desired, at a temperature high enough to cause sintering of the individual particles of polytetrafluoroethylene into a coherent mass. Thereafter, the electrode is removed from the casting surface and is cut to the desired shape, if not so formed by the casting operation. When, as in the more preferred electrode structure shown in FIG. 3, it is desirable to have a film 2b of polytetrafluoroethylene on the surface of the electrode whose main body is the polytetrafluoroethylene metal mix 2a and terminal grid 4 incorporated in the main body of the electrode, the casting surface is first coated with a film of polytetrafluoroethylene resin, either from an emulsion which is dried and sintered, or from a sheet of polytetrafluoroethylene resin on which is cast the polytetrafluoroethylene metal mix incorporating the screen, and finally molding the structure in integral composite pattern, as more fully disclosed in the Niedrach and Alford copending application cited above. Conveniently, lead 6 which is electrically connected to the terminal grid is led to the outside of the electrode at the interface of the gasket 11 and spacer 1. The electrodes 2 and 3 do not need to have this film 2b of polytetrafluoroethylene on them if the electrolyte is sorbed in the matrix. However, when electrolyte 24 is a free-flowing liquid, it will tend to penetrate the pores of electrodes 2 and 3 and enter chambers 9 and 13. This can be counteracted by proper control of the pressure of both the fuel and oxidant gases, but this requires accurate control to prevent the gases from being forced through the pores into the electrolyte chamber where they would mix and possibly cause damage to the fuel cell. By providing the electrodes 2 and 3 with the polytetrafluoroethylene surface 2b on the gas side of the electrode, flow of the electrolyte 24 into the gas chambers 9 and 13 is prevented, due to the hydrophobic nature of the polytetrafluoroethylene, yet this film still permits the fluid fuel and oxidant gas to diffuse into the body of the electrode to form a three-phase interface between the gas, electrolyte and electrode where the cell reaction occurs.

When the fuel cell is to be operated on air, end plate 14 may be provided with one or more openings, or may even take the shape of spacer 1 so that air has ready access to electrode 3. In this case, gas inlet 16 and gas outlet 17 may be eliminated.

With a fluid saturated hydrocarbon fuel, the overall cell reaction is the oxidation of the hydrocarbon to carbon dioxide and water. The respective cell reactions producing electricity at the anode 2 and cathode 3 are as follows, where methane is used as typical of the fluid saturated hydrocarbon fuels:

Anode (1) 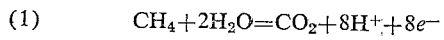

$$CH_4 + 2H_2O = CO_2 + 8H^+ + 8e^-$$

Cathode (2) 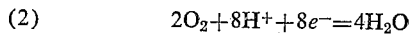

$$2O_2 + 8H^+ + 8e^- = 4H_2O$$

Typical of the various fluid saturated hydrocarbon fuels which I may use are the alkyl hydrocarbons, including cycloalkyl hydrocarbons and mixtures thereof which are gases or liquids at the temperature of the operation of the cell. Examples of such hydrocarbons are methane, ethane, propane, n-butane, isobutane, n-pentane, isopentane, neopentane, n-hexane and its isomers, e.g., 2-methylpentane, 2,2-dimethylbutane, 2,3-dimethylbutane, 3-methylpentane, cyclohexane, n-heptane and its isomers, n-octane and its isomers, n-decane and its isomers, n-dodecane and its isomers, n-hexadecane and its isomers, n-hexacosane and its isomers, etc., including mixtures, e.g., petroleum distillates, for example, gasoline, diesel fuel, petroleum ethers, mineral spirits, etc. The only requirement for these saturated hydrocarbon fuels is that they must be fluid, i.e., either gaseous or liquid, at the cell operating temperature. Because it is easier to use fuels for the fuel cell which are liquid or gaseous at room temperature, I prefer to use such fluid, saturated hydrocarbons as the fuels for my fuel cell. However, saturated hydrocarbon fuels which are solid at room temperature but which are liquids or gases at the cell operating temperature may be melted and introduced as fluids to my fuel cell.

For any particular fuel cell, operating at a given temperature with a given concentration of phosphoric acid, I have found that the maximum power which can be obtained from the fuel cell is dependent upon the particular fuel used. For example, the normal or straight-chain hydrocarbon fuels will produce a higher maximum power level than the corresponding isomeric branch-chain or cyclic hydrocarbon. I have also found that propane and n-butane will produce a higher maximum power than the other straight-chain saturated hydrocarbons. They will give about equal performance in the fuel cell. These two gases will produce the maximum power capability of a fuel cell under operating conditions which are some 10 to 25° C. below the temperature limitation for the other fuels. However, their performance in a fuel cell at operating conditions necessary for the other fuels is much better, i.e., more power is produced, than when operated at these lower temperatures. In order of decreasing performance the other normal hydrocarbons are in the order: pentane, ethane, methane, hexane, with the hydrocarbons above hexane showing decreased cell performance with increasing number of carbon atoms. However, all of the fluid hydrocarbon fuels perform satisfactorily in my fuel cell; the only effect this order of activity has on the fuel cell is on the maximum power that can be obtained for a given size cell at a given temperature and electrolyte concentration. If one desires to produce a fuel cell of a given size having a maximum power output, one would use either propane or butane as the fuel. However, in those cases where it is desirable to use any of the other fluid, saturated hydrocarbon fuels, for example, it is difficult or undesirable to use a gaseous saturated hydrocarbon; the liquid hydrocarbons can be used and cell operating conditions adjusted for obtaining the maximum power capability of the particular fuel chosen.

From a practical standpoint, fuel cells using flatplate type electrodes are usually constructed with both the anode and cathode electrode elements being of equal area. Since the fuel cells are constructed with various size electrode elements, a convenient basis for comparison of performance between fuel cells is to measure the performance based on the current produced for a given area of electrode. This value is known as the current density and is usually determined either in terms of milliamperes per square centimeter or amperes per square foot which is determined by dividing the total current output of the fuel cell by the dimensional area of the anode face in contact with the fuel. In the operation of a fuel cell, as the amount of current drawn from the cell increases, the current density increases in direct proportion and the voltage decreases in the manner characteristic of the fuel cell and its operation. A graph plotting the current density versus voltage of a fuel cell is known as a polarization curve.

Three polarization curves are shown in FIGURE 4. The upper curve is obtained with a fuel cell operated within the scope of my invention, while the two lower curves are obtained with the same fuel cell but outside the scope of my invention. All three curves were obtained using propane as the fuel and phosphoric acid as the electrolyte. The upper and lower curves were both obtained at 175° C., while the middle curve was obtained at 110° C. The upper curve was obtained using phosphoric acid concentration calculated as $P_2O_5$ of 65.7%, while the lower curve was obtained with a concentration of phosphoric acid calculated as $P_2O_5$ of 78.7%. The middle curve was obtained with a phosphoric acid concentration calculated as $P_2O_5$ of 44.9%.

The upper curve is illustrative of the type of polarization curve obtained with fluid, saturated hydrocarbon fuels when operated within the temperature range of 130–250° C. The temperature of 175° is within the range of from 100° C. below the boiling point up to the boiling point for the particular concentration of phosphoric acid used. The lower curve is typical of a polarization curve using fluid, saturated hydrocarbon fuels in a fuel cell operated within the prescribed range of 130–250° C. with a phoshporic acid electrolyte having a concentration which exceeds the prescribed limits. Its boiling point exceeds 350° C., and therefore the fuel cell when operated within the range of 130–250° C. is outside of the range of from 100° C. below the boiling point up to the boiling point of the particular electrolyte. The middle curve is one of the best polarization curves obtained with fluid, saturated hydrocarbon fuels in a fuel cell operated below the minimum temperature limit of 130° C. using phosphoric acid as the electrolyte. The concentration of the particular electrolyte is such that the operating temperature of 110° C. is within the limitation of from 100° C. below the boiling point up to the boiling point of the electrolyte.

In the case of the upper curve, it will be noted that after a current density of about 25 milliamperes per square centimeter is reached, the variation of current density with voltage is essentially linear. If this linear portion of the curve is extrapolated back to zero current density, it intercepts the voltage axis at about 0.66 volt, indicated as point A in FIG. 4. For the particular fuel cell operated under the conditions which produce this polarization curve, the maximum power capability of the fuel cell can be estimated by reading from the graph the current density produced at one-half of the voltage determined by point A, in this case, at 0.33 volt. At this voltage a current density of approximately 86.5 milliamperes per square centimeter is indicated by point B. At this voltage and current density, the fuel cell is producing slightly over 28.5 milliwatts per square centimeter. The fuel cell producing the middle curve was limited to producing a maximum current density of 30.5 milliamperes per square centimeter at about 0.35 volt. Attempts to draw a higher power density caused the voltage to drop to zero as indicated by the dotted portion of the curve. Likewise, the fuel cell conditions producing the lower polarization curve would not produce a current density greater than about 16.5 milliamperes per square centimeter at 0.21 volt before the voltage dropped to zero as indicated by the dotted portion of the curve. Both of these latter two fuel cells, therefore, failed to produce the maximum power capabilities of these fuel cells, because of these limiting current densities.

I have found that of all of the fluid, saturated hydrocarbon fuels, only propane and butane can be used as a fuel to produce the maximum power capability of a fuel cell operated at 120° C., and then only with certain concentrations of phosphoric acid. At 130° C., any of the fluid, saturated hydrocarbons can be used as the fuel. Of all the other aqueous, acid electrolytes only sulfuric acid can be used at this temperature at atmospheric pressure, but at this temperature sulfuric acid produces sulfur compounds when used as the electrolyte in a fuel cell using saturated hydrocarbons as a fuel. The sulfur compounds poison the electrodes causing the fuel cell to fail. Insofar as I have been able to determine, phosphoric acid is the only acid which is stable and can be used as an acid electrolyte at temperatures of at least 130° C. In fact, phosphoric acid is so stable that it can be used as a fuel cell electrolyte up to its boiling point. Those aqueous solutions of phosphoric acid which boil above 250° C. can be used above this temperature, but the lack of suitable materials of construction of the fuel cell to withstand the temperature and corrosive action of these solutions limits the fuel cells with phosphoric acid electrolytes to a maximum operating temperature of 250° C. Furthermore, as shown later, there is apparently no benefit to be gained by operating at temperatures higher than 250° C. The very concentrated solutions of phosphoric acid cannot be used because they reach a limiting current density before the maximum power capability of the fuel cell is attained.

Within the temperature range of 130° to 250° C., I have found that for a given fuel cell using a particular fluid, saturated hydrocarbon fuel, the maximum power capability of the fuel cell increases as the temperature of the electrolyte is increased. However, I have also found that for any particular temperature the maximum power capability of the fuel cell increases as the concentration of the electrolyte decreases providing the boiling point of the electrolyte is not exceeded. Boiling of the electrolyte destroys good contact of the electrolyte with the electrodes and thereby results in poor performance of the fuel cell.

Taking all of these factors into consideration, I have determined that fluid, saturated hydrocarbon fuels can be used in fuel cells to produce any power level up to and including the maximum power capability of the fuel cell providing the following limits are met: (1) phosphoric acid whose concentration, calculated as $P_2O_5$, is essentially 54 to 76%, preferably from 61 to 72%, is used as the electrolyte, (2) the temperature of the electrolyte is maintained at a temperature of from 130–250° C., preferably from 150–200° C., and (3) the concentration is so chosen that within this temperature range, the temperature of the electrolyte is also within the range of from 100° C., preferably 50° C., below the boiling point up to the boiling point of the electrolyte at the ambient pressure above the electrolyte. When operated within these limits, my fuel cell can convert fluid, saturated hydrocarbon fuels directly to electricity at power levels unobtainable with any other fuel cell using any other electrolyte whether acid or basic.

Although my fuel cells may be operated at below and above ambient atmospheric conditions, there is no apparent advantage to operating at other than ambient atmospheric conditions. Subatmospheric and superatmospheric pressures cause problems of constructing and operating the fuel cell. Generally, subatmospheric pressures cause poorer cell performance than ambient atmospheric. In the case of superatmospheric pressures, although generally giving better cell performance than atmospheric pressure, the gain in performance is not great enough to compensate for the added cost of construction and difficulties of operation.

Although phosphoric acid is a very old chemical, even the most recent literature cannot agree as to the boiling points of various concentrations of phosphoric acid, especially the more concentrated aqueous solutions which are known to contain polyphosphoric acid. The formation of polyphosphoric acids also accounts for the fact that phosphoric acid solutions containing more than 100% acid calculated as $H_3PO_4$ actually contain free water. Therefore, it is common practice to designate the concentration of phosphoric acid calculated on the percentage of $P_2O_5$ rather than on $H_3PO_4$ content. For purposes of this invention, the boiling point of a particular solution can readily be determined by observation. As a guide, the values in Table I give the temperatures at which various concentrations of phosphoric acid can be used within the scope of my invention at an ambient pressure of 760 millimeters of mercury based on the best boiling point data available.

TABLE I

| Concentration calculated as percent $P_2O_5$: | Temperature, ° C. |
|---|---|
| 54 | 130–135 |
| 58 | 130–145 |
| 61 | 130–150 |
| 65 | 130–170 |
| 69 | 130–205 |
| 71 | 130–230 |
| 72 | 150–250 |
| 73.5 | 175–250 |
| 76 | 200–250 |

Concentrations up to about 71% $P_2O_5$ are limited to uses when the electrolyte is below 250° C. at an ambient pressure of 760 mm. Hg, because their boiling point is less than 250° C. at this pressure. Concentrations greater than about 72% $P_2O_5$ are limited to uses where the electrolyte is 150° C. or higher because their boiling points are 250° C. or higher at this pressure. Because these limitations are real as determined by actual tests, I believe that apparently the more concentrated acids are not capable of supplying sufficient water for the anode reaction. However, the ability to supply sufficient water is not the only requirement. Dilute phosphoric acid solutions having sufficient water for the anode reaction will not produce the maximum power capabilities of a fuel cell at electrolyte temperatures below 130° C. with all fluid, saturated hydrocarbon fuels. The ability to produce the maximum power capabilities of the fuel cell without encountering a limiting current density is a function of both temperature and concentration of the phosphoric acid electrolyte as defined by my invention.

The following examples are illustrative of the practice of my invention and are given by way of illustration only and not for purposes of limitation.

In general, the cells used in the following examples were constructed as schematically illustrated in FIGS. 1 and 2, with some minor variations. The general shape of the fuel cell elements was round instead of square, end plates 10 and 14 and spacer 1 were all constructed of polytetrafluoroethylene and gaskets 11 and 15 were constructed of a polyfluoroethylene rubber. The dimensions of the electrolyte chamber, the fuel chamber and the oxidant gas chamber are approximately 0.125 inch thick x 1.5 inches in diameter.

A general method for making the electrode elements for the fuel cell was as follows. An aqueous suspension containing 59.6% by weight polytetrafluoroethylene was diluted with 7 volumes of water. A rigid aluminum foil was used as the casting surface on which was subscribed the ultimately desired pattern of the electrodes. The aluminum was placed on a hot plate maintained at 120–150° C. to facilitate evaporation of the water as the polytetrafluoroethylene emulsion was sprayed on it using an air brush. The desired amount of spray per unit area was then evenly distributed over the surface at a rate such that the wet areas did not accumulate and run. After the desired amount of emulsion had been sprayed onto the casting surface, it was heated to 350° C. to volatilize the emulsifying agent, and to sinter the polytetrafluoroethylene particles into a coherent film. A mixture of 0.035 cc. of an aqueous emulsion containing 59.6% by weight polytetrafluoroethylene having a density of about 1.5 was mixed with 0.35 gram of finely divided platinum black along with sufficient water to make a thin cream. After a uniform blend was obtained, the mix was spread uniformly over the electrode area and placed on a hot plate to evaporate the water, and then the temperature slowly increased to a final temperature of 250–350° C. to dispel the emulsifying agent. A similar procedure was used to form a second polytetrafluoroethylene-platinum powder mix directly on another casting surface without an underlying polytetrafluoroethylene film. A screen terminal grid was cut to the desired shape and centered over the electrode pattern on one of the two testing surfaces and the other casting surface was then centered on top of the terminal grid. This assembly was placed between two-press platens and molded at 350° C. for 2 minutes at a pressure of approximately 8,000 lbs./sq. in. of electrode area. Following pressing, the aluminum foil casting surfaces were dissolved from the electrodes in 20% aqueous sodium hydroxide and the electrode structures rinsed with 6 N sulfuric acid, then distilled water, and dried. By this technique electrodes were produced in which the terminal grid was sintered in the polytetrafluoroethylene-platinum mix, and the electrode was coated on one side with a pure film of polytetrafluoroethylene.

Those fuels which were gases at room temperature were fed to the fuel chamber at a rate of 10 ml. per minute. Those fuels which were liquid at room temperature but gas at the operating temperature were vaporized in an evaporator heated to the same temperature as the fuel cell to give 10 ml. per minute of gaseous fuel. Those fuels which were liquid at the fuel cell temperature were introduced as such into the fuel chamber and a reservoir maintained the fuel chamber full of liquid fuel. Oxygen was fed to the oxidant gas chamber at rates from 10–20 ml. per minute using the higher rate for the higher current densities. The flow of electrolyte changed the electrolyte in the chamber once every 10 minutes. The entire fuel cell was heated and maintained at the desired temperature in an insulated, thermostatically controlled, electrically heated chamber. In Example 4, where water was simultaneously introduced with the fuel, the fuel and water were independently vaporized and the vapors mixed in a proportion to give a mixture whose volume composition was 75% water and 25% fuel and the flow rate was 40 ml./min.

The results given in the following examples include all electrical circuit losses due to internal cell resistances, lead and contact resistances, etc. The observed current density was plotted against observed voltage and a smooth curve drawn through the results. The values reported in the tables given in the examples were read from the curve. In this way the various runs could be compared at the same current density values. I have determined by repeated tests that the curves would agree within the experimental error, and that the smoothed curved represents the average value which one would obtain in a series of runs.

In all the tables of the examples, the temperature is given in degrees centigrade and the concentration of the phosphoric acid electrolyte is calculated on the percentage by weight of $P_2O_5$. The voltage is given in volts and the current density is in milliamperes per square centimeter. The underscored value is the recorded current density value which is nearest to the actual current density value giving maximum power for the cell operating conditions. In Table II, this value was recorded to the nearest milliampere per square centimeter below 50. In all other cases, it is indicated to the nearest tabulated value, with the actual maximum power being developed at some point intermediate between the values immediately above and below the underscored value. In all cases, the underscored value demonstrates that the maximum power capability of the fuel cell has been attained for the particular fuel and cell operating conditions and even has current overload capacity.

*Example 1*

In this example, various concentrations of phosphoric acid at different temperatures were used, with methane as the fuel and oxygen as the oxidant gas. The results are given in Table II.

perature increases as the concentration of the phosphoric acid decreases.

TABLE II

| Current Density | Temperature | | | | | | | | | | |
|---|---|---|---|---|---|---|---|---|---|---|---|
| | 120 | 130 | 140 | 150 | | | | 175 | | | 200 |
| | Concentration | | | | | | | | | | |
| | 54.3 | 61.6 | 61.6 | 61.6 | 69.4 | 73.9 | 76.1 | 69.4 | 73.9 | 76.1 | 73.9 |
| 5 | 0.60 | 0.62 | 0.70 | 0.72 | 0.58 | 0.52 | 0.36 | 0.73 | 0.61 | 0.53 | 0.77 |
| 10 | .49 | .53 | .62 | .64 | .50 | .44 | .23 | .66 | .54 | .44 | .71 |
| 15 | (¹) | .46 | .56 | .58 | .43 | .37 | (³) | .61 | .49 | .35 | |
| 20 | | .41 | .50 | .53 | .37 | .31 | | .57 | .45 | .27 | .65 |
| 25 | | .36 | .46 | .48 | .30 | (²) | | .55 | .42 | (⁴) | |
| 30 | | .32 | .42 | .44 | .24 | | | .52 | .38 | | .60 |
| 32 | | .30 | | | | | | | | | |
| 35 | | .27 | .38 | .40 | | | | .47 | .31 | | .56 |
| 40 | | | .34 | .36 | | | | | .30 | | |
| 42 | | | | | | | | | | | |
| 45 | | | .31 | .33 | | | | | .27 | | |
| 48 | | | | .31 | | | | | | | |
| 50 | | | .27 | .29 | | | | .44 | .24 | | .52 |
| 55 | | | .24 | .26 | | | | .35 | | | |
| 70 | | | | | | | | .31 | | | |
| 80 | | | | | | | | | | | .41 |
| 90 | | | | | | | | .27 | | | .37 |
| 100 | | | | | | | | .23 | | | .33 |

¹ Limiting current density of 16 at 0.40 volt.
² Limiting current density of 22.5 at 0.29 volt.
³ Limiting current density of 10.5 at 0.21 volt.
⁴ Limiting current density of 20 at 0.27 volt.

The power density in milliwatts per square centimeter is obtained by multiplying the current density by the corresponding voltage. The results in this table show:

(1) A minimum temperature of 130° C. is necessary in order not to encounter a limiting current density and this temperature increases as the concentration of the phosphoric acid increases above certain limits.

(2) The amount of power produced at a given temperature increases as the concentration of the phosphoric acid decreases.

(3) The amount of power produced at a given concentration of phosphoric acid increases as the temperature increases.

*Example 2*

Tables III and IV give the results obtained with propane as the fuel at different temperatures with various concentrations of phosphoric acid. Oxygen was used as the oxidant gas.

TABLE III

| Current Density | Temperature | | | | | | | |
|---|---|---|---|---|---|---|---|---|
| | 90 | 110 | 120 | | | | | 140 |
| | Concentration | | | | | | | |
| | 36.2 | 61.6 | 44.9 | 54.3 | ¹ 54.3 | 69.4 | 73.9 | 61.6 |
| | Voltage | | | | | | | |
| 5 | 0.51 | 0.38 | 0.60 | 0.61 | 0.48 | 0.50 | (⁵) | 0.63 |
| 10 | (²) | (³) | .54 | .55 | .42 | .42 | | .57 |
| 15 | | | .50 | .50 | .38 | .37 | | .53 |
| 20 | | | .47 | .45 | .35 | .32 | | .50 |
| 25 | | | .43 | .40 | .32 | .27 | | .46 |
| 30 | | | .37 | .36 | .29 | .22 | | .44 |
| 40 | | | | (⁴) | .24 | .13 | | .38 |
| 50 | | | | | .23 | .20 | | .34 |
| 60 | | | | | | .15 | | .32 |
| 70 | | | | | | | | .28 |
| 80 | | | | | | | | .24 |
| 90 | | | | | | | | .21 |

¹ Cyclopropane fuel.
² Limiting current density of 9.0 at 0.43 volt.
³ Limiting current density of 9.5 at 0.23 volt.
⁴ Limiting current density of 30.5 at 0.35 volt.
⁵ Limiting current density of 3.5 at 0.21 volt.

TABLE IV

| Current Density | Temperature | | | | | | | | | | | | |
|---|---|---|---|---|---|---|---|---|---|---|---|---|---|
| | 150 | | | | 175 | | | | 200 | | | 250 |
| | Concentration | | | | | | | | | | | | |
| | 61.6 | 69.4 | 73.9 | 75.9 | 65.7 | 69.4 | 73.9 | 76.0 | 78.7 | 70.5 | 75.9 | 78.7 | 73.5 |
| | Voltage | | | | | | | | | | | | |
| 5 | 0.65 | 0.58 | 0.52 | 0.44 | 0.76 | 0.66 | 0.60 | 0.51 | 0.42 | 0.79 | 0.62 | 0.53 | 0.77 |
| 10 | .59 | .50 | .45 | .36 | .69 | .59 | .53 | .41 | .32 | .71 | .54 | .46 | .71 |
| 15 | .55 | .45 | .41 | .27 | .64 | .54 | .48 | .36 | .24 | .66 | .48 | .40 | .67 |
| 20 | .51 | .42 | .37 | .16 | .61 | .50 | .44 | .31 | (2) | .63 | .44 | .35 | .63 |
| 25 | .48 | .39 | .33 | (1) | .58 | .46 | .41 | .27 | | .61 | .40 | .27 | .60 |
| 30 | .45 | .37 | .30 | | .56 | .44 | .38 | .22 | | .58 | .37 | .19 | .58 |
| 40 | .41 | .32 | .22 | | .52 | .40 | .34 | .15 | | .54 | .30 | (3) | .53 |
| 50 | .37 | .29 | .15 | | .48 | .38 | .30 | | | .50 | .23 | | .50 |
| 60 | .35 | .26 | | | .44 | .36 | .26 | | | .47 | .16 | | .46 |
| 70 | .32 | .22 | | | .40 | .33 | .22 | | | .44 | | | .43 |
| 80 | .29 | .18 | | | .36 | .28 | .18 | | | .41 | | | .40 |
| 90 | .26 | | | | .33 | .24 | | | | .38 | | | .36 |
| 100 | .23 | | | | .29 | .21 | | | | .35 | | | .33 |
| 110 | | | | | .25 | | | | | .32 | | | .30 |
| 120 | | | | | | | | | | .30 | | | .27 |
| 130 | | | | | | | | | | .27 | | | .23 |
| 140 | | | | | | | | | | .24 | | | .20 |

1 Limiting current density of 21 at 0.15 volt.
2 Limiting current density of 16.5 at 0.21 volt.
3 Limiting current density of 30.5 at 0.18 volt.

The results bear out the same observations noted in Example 1. However, it is to be noted that propane and cyclopropane both will produce the maximum power capability of a fuel cell at certain phosphoric acid concentrations at 120° C. However, higher power levels are obtained by operating at the higher temperatures and at the acid concentrations noted for methane. Similar results to those for propane and its isomer are obtained with the butane and its isomers. It is to be noted that the results obtained at 250° C. do not show as great an increase from the results at 200° C. as is noted between the results of 150° C. and 200° C., indicating that 150–200° C. is the optimum temperature range.

*Example 3*

Table V gives the results obtained with various fluid, saturated hydrocarbon fuels at 150° C. using phosphoric acid whose concentration, calculated as $P_2O_5$, was 61.6%. Oxygen was used as the oxidant gas.

These results when compared with the results in Tables II, III and IV show the order of reactivity of the various fuels. Decane and hexadecane are liquids at 150° C. It will be noted that propane and n-butane are essentially identical with their isomers being slightly less reactive at temperatures of 150° C. and lower. Surprisingly enough, at temperatures above 175° C., I have found that all the isomers produce polarization curves which are practically superimposable on each other for identical temperature and acid concentrations.

*Example 4*

Table VI gives the results with n-pentane, n-octane and white gasoline containing no motor fuel additives at 200° C. and a phosphoric acid concentration of 69.5% calculated as $P_2O_5$. The latter two fuels were also used in conjunction with water vapor to demonstrate the higher powers which can be obtained by use of water along with the fuel. Oxygen was used as the oxidant gas.

TABLE V

| Current Density | Fuel | | | | | | | | | |
|---|---|---|---|---|---|---|---|---|---|---|
| | Ethane | n-Butane | Iso-butane | n-Pentane | Cyclo-pentane | n-Hexane | n-Heptane | n-Octane | n-Decane | n-Hexa-decane |
| | Voltage | | | | | | | | | |
| 5 | 0.65 | 0.73 | 0.62 | 0.63 | 0.58 | 0.56 | 0.57 | 0.61 | 0.58 | 0.42 |
| 10 | .59 | .64 | .54 | .55 | .51 | .48 | .51 | .52 | .46 | .29 |
| 15 | .55 | .58 | .49 | .49 | .46 | .43 | .46 | .45 | .39 | .24 |
| 20 | .51 | .53 | .45 | .45 | .42 | .40 | .42 | .39 | .33 | .19 |
| 25 | .48 | .50 | .42 | .41 | .39 | .38 | .38 | .35 | .28 | .15 |
| 30 | .47 | .47 | .39 | .38 | .35 | .35 | .35 | .31 | .23 | .10 |
| 40 | .40 | .42 | .34 | .33 | .29 | .31 | .29 | .24 | .14 | .01 |
| 50 | .34 | .38 | .31 | .29 | .23 | .27 | .23 | .16 | .06 | |
| 60 | .29 | .35 | .27 | .26 | .17 | .23 | .18 | .10 | | |
| 70 | .23 | .31 | .24 | .24 | | .19 | | | | |
| 80 | .17 | .28 | .21 | .21 | | .15 | | | | |
| 90 | | .24 | .18 | .19 | | | | | | |
| 100 | | .20 | | | | | | | | |

TABLE VI

| Current Density | Fuel | | | | |
|---|---|---|---|---|---|
| | n-Pentane | n-Octane | n-Octane and water | White gasoline | White gasoline and water |
| 5 | 0.69 | 0.66 | 0.70 | 0.60 | 0.60 |
| 10 | .63 | .60 | .65 | .52 | .52 |
| 15 | .59 | .55 | .62 | .47 | .47 |
| 20 | .55 | .51 | .60 | .42 | .43 |
| 25 | .52 | .48 | .57 | .39 | .40 |
| 30 | .49 | .45 | .54 | .35 | .38 |
| 40 | .44 | .40 | .50 | .30 | .34 |
| 50 | .40 | .36 | .45 | .26 | .32 |
| 60 | .37 | .31 | .40 | .23 | .29 |
| 70 | .34 | .26 | .36 | .20 | .27 |
| 80 | .32 | .21 | .31 | .17 | .24 |
| 90 | .29 | .16 | .26 | .15 | .22 |
| 100 | .25 | | .21 | | .19 |

In addition to the above fuels, I have also used diesel oil, purified to remove fuel additives, as a fuel with results similar to those obtained with hexadecane (also called cetane) which is the main constituent of diesel oil. I have also operated my fuel cells with air instead of oxygen as the oxidant gas. In these latter cases, I used an open face plate so that the cathode was exposed to the air with no oxidant gas chamber.

In obtaining the results of the above examples, samples of the effluent fuel gas were sampled for many of the fuels and analyzed for carbon dioxide while the cell was operated under constant load for an extended period of time. In all cases, the rate of carbon dioxide production agreed within experimental error with the theoretical amount which should have been produced for the fuel consumed to produce the rate of current produced. No other cell by-products were observed in the effluent gas or electrolyte, showing that the fluid, saturated hydrocarbon fuels consumed were being converted completely to carbon dioxide.

The results of the above examples clearly show that my fuel cells are capable of operating at current densities up to and even exceeding the current density at the maximum power capability of the cell. For more efficient conversion of fuel into electricity, it is usually desirable to operate the fuel cell at a somewhat higher voltage than can be obtained when operated at the maximum power capability of the cell. The choice of this voltage is dependent on design and intended use of the fuel cell. As demonstrated by the examples, for any given voltage, conditions can be chosen to maximize the current density and thus the amount of power that can be produced at this voltage and yet provide a reserve of power to meet any power overloads up to the maximum power capability of the cell. My invention has therefore provided a fuel cell which can be operated at any desired efficiency, at power levels heretofore unobtainable with fluid, saturated hydrocarbon fuels.

The procedures given in the above examples are not limited to the particular metal catalysts described. Other catalytically active metals previously described may be used as well.

Other modifications of this invention and variations in the structure may be employed without departing from the scope of the invention. For example, the shape of the cell may be varied and may be conveniently chosen to fit into an existing space. Two or more of these cells may be joined together to produce batteries.

The fuel cells of this invention may be used for any application where a reliable source of direct current electric power is required to activate motors, instruments, radio transmitters, lights, heaters, etc. The power from the fuel cells may also be used to drive a thermoelectric refrigerator which requires a low voltage source of direct current.

These and other modifications of this invention which will be readily discernible to those skilled in the art, may be employed within the scope of the invention. The invention is intended to include all such modifications and variations as may be embraced within the following claims.

What I claim as new and desire to secure by Letters Patent of the United States is:

1. The process of producing electrical energy from a fluid, saturated hydrocarbon fuel which comprises bringing a fluid, saturated hydrocarbon fuel in direct contact with one of the two major surfaces of a gas-permeable, electronically conductive electrode element, bringing an oxidant gas in direct contact with one of the two major surfaces of another gas-permeable, electronically conductive electrode element, said two electrode elements having their other major surface in direct electrical contact with an aqueous solution of phosphoric acid whose concentration, calculated as $P_2O_5$, is from 54 to 76%, said electrolyte being maintained at a temperature of at least 130° C. but no greater than 250° C. and in the range of from 100° C. below the boiling point up to the boiling point of the electrolyte at the ambient pressure above the electrolyte.

2. The process of claim 1 wherein the hydrocarbon fuel is methane.

3. The process of claim 1 wherein the hydrocarbon fuel is propane.

4. The process of claim 1 wherein the hydrocarbon fuel is butane.

5. The process of claim 1 wherein the hydrocarbon fuel is pentane.

6. The process of claim 1 wherein the hydrocarbon fuel is hexadecane.

7. The process according to claim 1 in which the saturated hydrocarbon is a gaseous hydrocarbon.

References Cited

UNITED STATES PATENTS

| 3,097,974 | 7/1963 | McEvoy et al. | 136—86 X |
| 3,098,772 | 7/1963 | Taschek | 136—86 X |
| 3,132,973 | 5/1964 | Duddy et al. | 136—86 |
| 3,134,697 | 5/1964 | Niedrach | 136—86 |
| 3,188,241 | 6/1965 | Weiss et al. | 136—86 |

FOREIGN PATENTS

| 1,282,491 | 12/1961 | France. |
| 1,299,346 | 6/1962 | France. |
| 1,313,724 | 11/1962 | France. |

WINSTON A. DOUGLAS, *Primary Examiner.*

ALLEN B. CURTIS, *Examiner.*